(12) United States Patent
Stroobants

(10) Patent No.: US 6,322,743 B1
(45) Date of Patent: Nov. 27, 2001

(54) METHOD OF FORMING EVACUATED INSULATION PANELS

(75) Inventor: Jan Maurice Stroobants, Bekkevoort (BE)

(73) Assignee: Imperial Chemical Industries PLC, London (GB)

(*) Notice: Subject to any disclaimer, the term of this patent is extended or adjusted under 35 U.S.C. 154(b) by 0 days.

(21) Appl. No.: 09/233,656

(22) Filed: Jan. 18, 1999

(30) Foreign Application Priority Data

Jan. 19, 1998 (EP) .................................................. 98100808

(51) Int. Cl.$^7$ .................................................. B29C 67/20
(52) U.S. Cl. ............................................. 264/321; 264/51
(58) Field of Search .................... 264/313, 321, 264/51; 428/69, 71, 76

(56) References Cited

U.S. PATENT DOCUMENTS

| | | | |
|---|---|---|---|
| 5,271,980 | * 12/1993 | Bell | 428/68 |
| 5,393,799 | * 2/1995 | De Vos et al. | 521/157 |
| 5,478,867 | 12/1995 | Tabor . | |
| 5,578,656 | * 11/1996 | Gillis et al. | 521/166 |
| 5,698,601 | 12/1997 | Welte et al. . | |
| 5,712,015 | * 1/1998 | Gullem | 428/71 |
| 5,730,896 | * 3/1998 | Gillis et al. | 252/182.23 |
| 5,844,014 | * 12/1998 | Malone | 521/146 |
| 5,851,458 | * 12/1998 | De Vos et al. | 264/46.5 |
| 5,977,197 | * 11/1999 | Malone | 521/146 |

FOREIGN PATENT DOCUMENTS

| | | |
|---|---|---|
| 4439328 | 11/1994 | (DE) . |
| 792 732 | 9/1997 | (EP) . |
| 2 286 234 | 8/1995 | (GB) . |
| 07/042893 | 2/1995 | (JP) . |
| 97/27986 | 8/1997 | (WO) . |

* cited by examiner

Primary Examiner—Allan R. Kuhns
(74) Attorney, Agent, or Firm—Pillsbury Winthrop LLP

(57) ABSTRACT

Method for producing an evacuated insulation panel comprising the steps of enveloping an open celled (semi-)rigid insulating foam in a substantially gas impermeable flexible vessel, evacuating the whole and sealing, wherein the panel is compressed during or after evacuation and sealing to a thickness of 10 to 90% of its initial thickness prior to compression.

26 Claims, 1 Drawing Sheet

METHOD OF FORMING EVACUATED INSULATION PANELS

BACKGROUND OF THE INVENTION

This invention relates to evacuated insulation panels, a method for the production thereof and their use for thermal insulation purposes.

Evacuated insulation panels and methods for their production are known.

Evacuated insulation panels having a reduced internal pressure are known for various uses including use in refrigeration appliances where they greatly enhance the degree of thermal insulation within the cabinet of the appliance.

Such evacuated insulation panels generally comprise a low thermal conductivity filler material and a vessel formed of a gastight film enveloping said filler, the whole being evacuated to an internal pressure of about 5 mbar or less and then hermetically sealed. Besides insulation the filler has also the function of supporting the skin of the vessel so that it does not collapse when it is evacuated.

Known filler materials for use in such evacuated insulation panels include finely divided inorganic powders such as fumed silica, silica dust, precipitated silica, precipitated silica/fly ash mixtures, alumina, fine perlite and fiberglass. It has also been proposed, in Japanese Patent Application Kokai No. 133870/82, to use organic foamed materials having open cells as the core material in evacuated insulation panels, for example, open celled rigid polyurethane foam (see European Patent Publications Nos 0498628 and 0188806).

WO 97/27986 describes a method to improve the thermal insulation properties of an evacuated insulation panel filled with an open celled rigid insulating foam. This method involves compressing the open celled rigid foam to a thickness of 40 to 90% of its initial thickness prior to compression, enclosing the compressed foam in a receptacle, evacuating the receptacle to a partial or near total vacuum and hermetically sealing the receptacle. The insulating performance of the foam on a per unit thickness is enhanced by compression of the foam.

However evacuated panels compressed according to the method described in WO 97/27986 are not completely flat and the surface of the panels shows a lot of wrinkles. This can lead to air entrapments when the panel is foamed-in-place in a refrigerator cabinet.

Therefore it is an object of the present invention to provide an evacuated insulation panel comprising an open celled insulating foam having improved thermal insulation properties.

It is a further object of the present invention to provide an evacuated insulation panel comprising an open celled insulating foam, said panel having a very flat surface with zero or almost zero wrinkles.

DETAILED DESCRIPTION OF THE INVENTION

Figure 1:
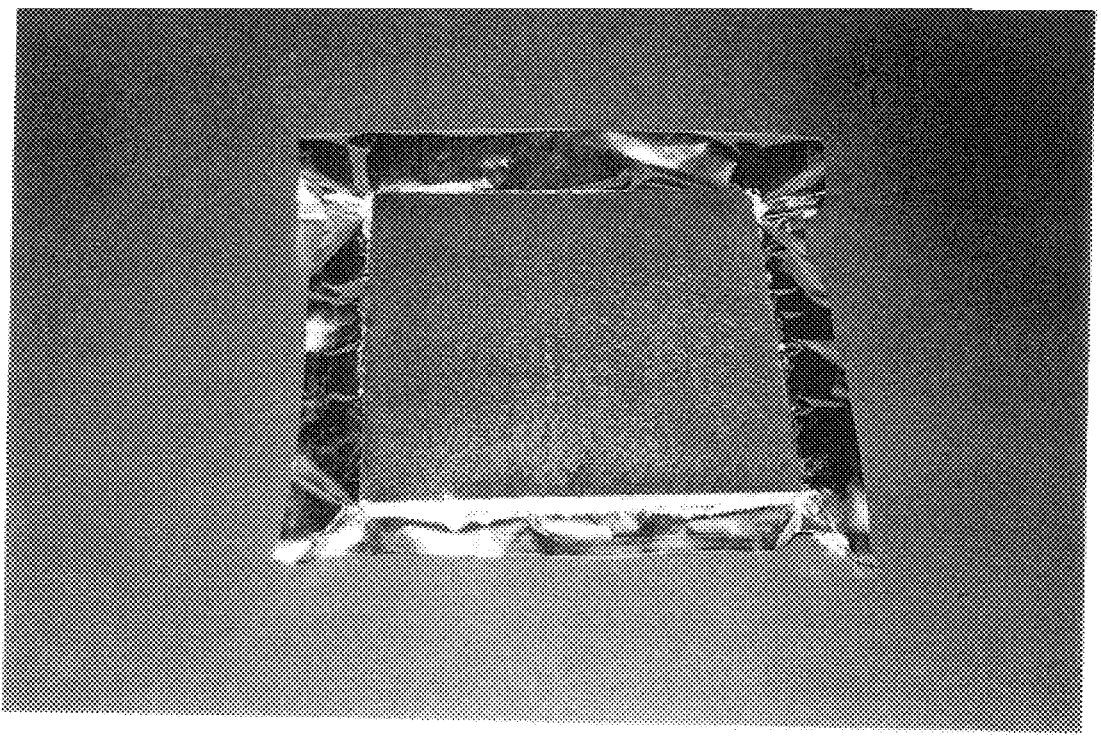
FIGS. 1 and 2 are photographs of insulation panels illustrating different surface characteristics which result depending upon the timing of compression relative to evacuation and sealing of the vessel enveloping the foam.
Figure 2:
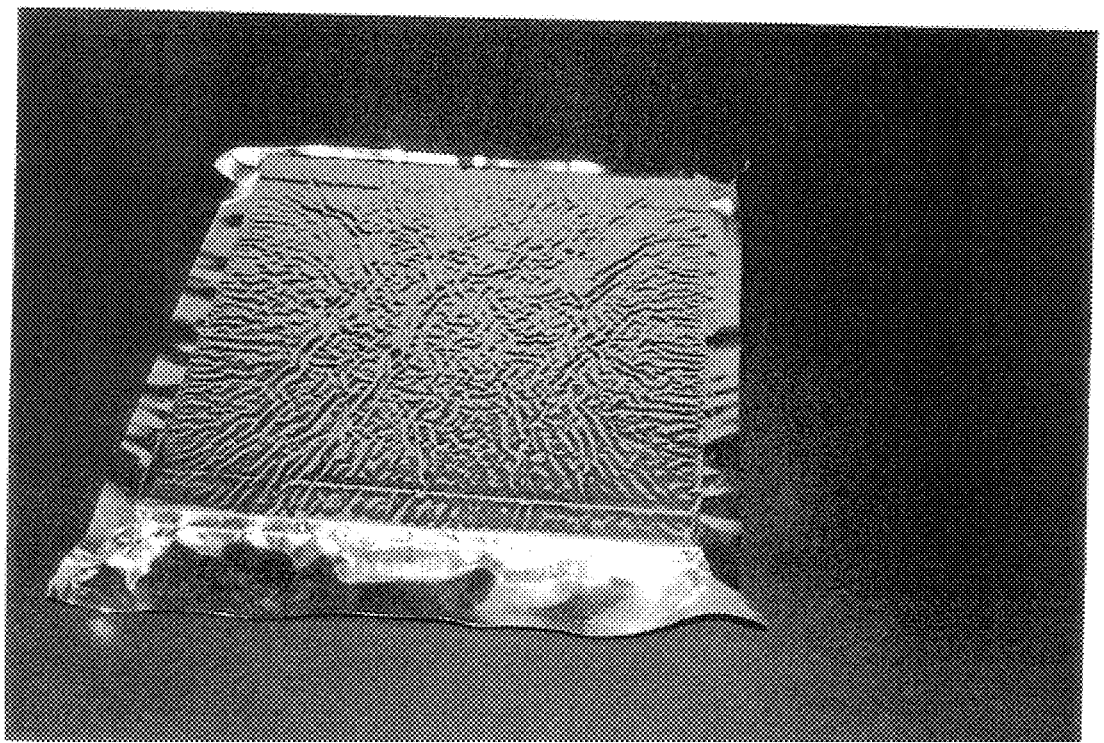

According to the present invention an evacuated insulation panel comprising an open celled insulating foam is provided, said panel after its manufacture being compressed to a thickness of 10 to 90% of its initial thickness prior to compression.

Compressed evacuated insulation panels of the present invention have a lower thermal conductivity than non-compressed panels. Further the panels are near flat and the surface of the panels shows zero or almost no wrinkles. This makes it easier to stick the panels to the sides of the unit to be insulated. The panels also show an improved dimensional stability when heated which is beneficial in the process of encapsulating the panels within insulating foam. During the encapsulation process the panels are subjected to a higher temperature (generally about 80° C.) for a short period of time.

The evacuated insulation panels of the present invention are made by enveloping an open celled insulating foam in a substantially gas impermeable flexible vessel, evacuating the whole and sealing, whereby the panel is compressed to a thickness of 10 to 90% of its initial thickness during or after evacuation and sealing.

Preferably the compression takes places after evacuation and sealing but it can also take place simultaneously with the evacuation and sealing. The panel is compressed to a thickness of 10 to 90% of its initial thickness, preferably to a thickness of between 20 and 80% of its initial thickness, more preferably to a thickness of between 40 and 60% of its initial thickness, most preferably to about 50% of its initial thickness. Compression may be accomplished by any means known in the art such as between opposing parallel plates or opposing rolls. Compression may be effected on-line as part of a continuous manufacturing process or may be effected off-line on individual panels. Compression usually takes place at room temperature but any temperature between 10 and 150° C. can be used. Preferably the temperature is between 20 and 120° C., most preferably between 70 and 100° C. Heating while compressing the panels even further improves the surface appearance and flatness.

Suitable insulating foams to be used as filler for the evacuated insulation panels of the present invention are open celled organic foamed materials. The foams have an open celled content of at least 70%, preferably at least 90%, and most preferably at least 95%. The foam is preferably as close as possible to complete or 100% open cells. The foam (prior to compression) preferably has a density of 16 to 250 kg/m$^3$ and most preferably 25 to 100 kg/m$^3$. Density will increase proportionally with the extent of compression.

The open celled organic foamed materials to be used as insulating foam may be derived from the following materials: polyurethanes, polystyrenes, polyethylenes, acrylics, phenolics (such as phenol formaldehyde), halogenated polymers such as polyvinylchloride. In this invention most preference is given to open celled rigid polyurethane and urethane-modified polyisocyanurate foams.

Open celled rigid polyurethane and urethane-modified polyisocyanurate foams are in general prepared by reacting the appropriate organic polyisocyanate and polyfunctional isocyanate-reactive compound in the presence of a cell-opening agent. Examples of formulations for making open celled rigid polyurethane foam are described in European Patent Publications Nos 0498628, 0547515, 0188806 and in PCT Patent Publication No. 95/02620.

Suitable organic polyisocyanates for use in the preparation of open celled rigid polyurethane foams include any of those known in the art for the preparation of rigid polyurethane or urethane-modified polyisocyanurate foams, and in particular the aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or "polymeric" MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanatobenzene. Special mention may be made of the so-called MDI variants (diphenylmethane diisocyanate modified by the introduction of urethane, allophanate, urea, biuret, carbodiimide, uretonimine or isocyanurate residues). Other organic polyisocyanates which may be mentioned include the aliphatic diisocyanates such as isophorone diisocyanate, 1,6-diisocyanatohexane and 4,4'-diisocyanatodicyclohexylmethane.

Polyfunctional isocyanate-reactive compositions for use in the preparation of open celled rigid polyurethane foams include any of those known in the art for the preparation of rigid polyurethane or urethane-modified polyisocyanurate foams. Of particular importance for the preparation of rigid foams are polyols and polyol mixtures having average hydroxyl numbers of from 300 to 1000, especially from 300 to 700 mg KOH/g, and hydroxyl functionalities of from 2 to 8, especially from 3 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include polyols, for example, glycerol, trimethylolpropane, triethanolamine, pentaerythritol, sorbitol and sucrose, and polyamines, for example ethylene diamine, tolylene diamine, diaminodiphenylmethane and polymethylene polyphenylene polyamines, and aminoalcohols, for example, ethanolamine and diethanolamine, and mixtures of such initiators. Other suitable polymeric polyols include polyesters obtained by the condensation of appropriate proportions of glycols and higher functionality polyols with dicarboxylic acids. Still further suitable polymeric polyols include hydroxyl terminated polythioethers, polyamides, polyesteramides, polycarbonates, polyacetals, polyolefins and polysiloxanes.

The quantities of the polyisocyanate compositions and the polyfunctional isocyanate-reactive compositions to be reacted will depend upon the nature of the rigid polyurethane or urethane-modified polyisocyanurate foam to be produced and will be readily determined by those skilled in the art.

Isocyanate indices of from 70 to 140 will typically be used in preparing open celled rigid polyurethane foams but lower indices may be used if desired. Higher indices, for example 150 to 500 or even up to 3000, may be used in conjunction with trimerisation catalysts to make foams containing isocyanurate linkages.

The preparation of open celled rigid polyurethane foam may be carried out in the presence of any of the blowing agents known in the art for the preparation of rigid polyurethane or urethane-modified polyisocyanurate foams. Such blowing agents include water or other carbon dioxide-evolving compounds, or inert low boiling compounds having a boiling point of above −70° C. at atmospheric pressure.

The amount of water used as blowing agent may be selected in known manner to provide foams of the desired density, typical amounts being in the range from 0.05 to 5 parts by weight per 100 parts by weight of reactive ingredients, although it may be a particular embodiment of the present invention to incorporate up to 10% by weight or even up to 20% by weight of water.

Suitable inert blowing agents include, for example, hydrocarbons, dialkyl ethers, alkyl alkanoates, aliphatic and cycloaliphatic hydrofluorocarbons, hydrochlorofluorocarbons, chlorofluorocarbons and fluorine-containing ethers. Suitable hydrocarbon blowing agents include lower aliphatic or cyclic hydrocarbons such as n-pentane, isopentane, cyclopentane, neopentane, hexane and cyclohexane.

In order to reach low thermal conductivity levels at reduced pressure levels, open celled rigid polyurethane foams having decreased cell sizes (in the range 50 to 150 micron) (prior to compression) can be used. These fine celled open celled rigid polyurethane foams can be obtained by air-nucleation or by incorporating a substantially insoluble organic compound into the foam-forming mixture.

Air-nucleation is the use of very finely dispersed gas bubbles (<10 $\mu$m) in one or both foam components prior to mixing of the foam components and subsequent foam formation. These bubbles enable finer foams to be obtained.

The insolubility of the organic liquid in the reaction mixture usually arises from the fact that it is insoluble in one or more of the major ingredients of the foam formulation, especially the isocyanate-reactive material and/or the polyisocyanate. Solubility in these materials can be determined by conventional techniques. The term "insoluble" as used herein with respect to the insoluble organic liquid is defined as showing a solubility in either the isocyanate-reactive composition or the polyisocyanate composition with which it is to be blended of less than 500 ppm by weight at 25° C. and atmospheric pressure.

Examples of insoluble organic liquids include fluorinated compounds, especially substantially fluorinated or perfluorinated compounds. A substantially fluorinated compound as used herein is defined as a compound wherein at least 75% and preferably at least 90% and most preferably at least 99% of the hydrogen atoms have been replaced by fluorine atoms.

Insoluble fluorinated compounds for use in the preparation of fine celled open celled rigid polyurethane foam include any of those described in U.S. Pat. Nos. 4,981,897, 5,034,424, 4,972,002, EP 0508649, EP 0498628, WO 95/18176.

Suitable compounds include substantially fluorinated or perfluorinated hydrocarbons, substantially fluorinated or perfluorinated ethers, substantially fluorinated or perfluorinated tertiary amines, substantially fluorinated or perfluorinated amino-ethers and substantially fluorinated or perfluorinated sulphones.

Suitable examples of substantially fluorinated or perfluorinated hydrocarbons are those containing from 1 to 15 carbon atoms, which may be either cyclic or acyclic, either aromatic or aliphatic and either saturated or unsaturated, such as substantially fluorinated or perfluorinated methane, ethane, propane, butane, pentane, hexane, heptane, octane, nonane, decane, cyclobutane, cyclooctane, cyclohexane, cyclopentane, cycloheptane, norbornadiene, decaline, dimethylcyclobutane, methylcyclohexane, 1-methyldecaline, phenanthrene, dimethylcyclohexane, and isomers thereof and perfluoro(cyclo)olefins such as hexafluoropropene dimers and trimers. Particular mention may be made of the various isomers of perfluoropentane and perfluorohexane and perfluoro(4-methylpent-2-ene).

Particular examples of substantially fluorinated or perfluorinated ethers include: perfluorobutyltetrahydrofuran and perfluoropropyltetrahydrofuran.

Particular examples of substantially fluorinated or perfluorinated amino-ethers include perfluorinated N-($C_{1-6}$ alkyl) morpholines such as N-methyl, N-ethyl and N-isopropylmorpholine.

To ensure zero ozone depletion potential, it is preferred to use fluorinated compounds containing no other halogen atoms.

Certain insoluble organic liquids suitable for use in the preparation of fine celled open celled rigid polyurethane foam may themselves act as blowing agents under the conditions pertaining to the foam-forming reaction, particularly where their boiling point is lower than the exotherm temperature achieved by the reaction mixture. For the avoidance of doubt, such materials may, partly or completely, fulfil the function of blowing agent in addition to that of insoluble organic liquid.

The amount of the insoluble organic liquid to be used in the preparation of fine celled open celled rigid polyurethane foam ranges from 0.05 to 10%, preferably from 0.1 to 5%, most preferably from 0.6 to 2.3% by weight based on the total reaction system.

The substantially insoluble organic liquid will usually be incorporated in the foam-forming reaction mixture in the form of an emulsion or preferably a microemulsion in one of the major components, that is to say in the isocyanate-reactive component and/or the polyisocyanate component. Such emulsions or microemulsions may be prepared using conventional techniques and suitable emulsifying agents.

Emulsifying agents suitable for preparing stable emulsions or microemulsions of fluorinated liquid compounds in organic polyisocyanates and/or isocyanate-reactive compounds include surfactants chosen from the group of nonionic, ionic (anionic or cationic) and amphoteric surfactants. Preferred surfactants for emulsifying the fluorinated liquid compound in the isocyanate-reactive composition are fluoro surfactants, silicone surfactants and/or alkoxylated alkanes. The amount of emulsifying agent used is between 0.02 and 5 pbw per 100 pbw of foam-forming reaction system and between 0.05 and 10 pbw per 100 pbw of polyisocyanate or polyol composition.

In addition to the polyisocyanate and polyfunctional isocyanate-reactive compositions, the blowing agent and, optionally, the insoluble organic liquid, the foam-forming reaction mixture will commonly contain one or more other auxiliaries or additives conventional to formulations for the production of open celled rigid polyurethane and urethane-modified polyisocyanurate foams. Such optional additives include crosslinking agents, for example low molecular weight polyols such as triethanolamine, foam-stabilising agents or surfactants, for example siloxane-oxyalkylene copolymers, urethane catalysts, for example tin compounds such as stannous octoate or dibutyltin dilaurate, fire retardants, for example halogenated alkyl phosphates such as tris chloropropyl phosphate or alkyl phosphonates, infrared attenuating agents such as carbon black, and cell-opening agents such as polymer particles (such as polymer polyols), incompatible liquids such as solvents or polyols, inorganic fillers such as bentonite clay, silica particles (particularly fumed silica), metal flakes and stearates.

A particularly preferred process for the preparation of open celled rigid polyurethane or urethane-modified polyisocyanurate foam comprises the step of reacting an organic polyisocyanate with an isocyanate-reactive material in the presence of a blowing promotor being an isocyanate-reactive cyclic compound of formula:

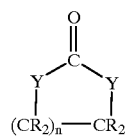

(I)

wherein
Y is O or $NR^1$ wherein each $R^1$ independently is a lower alkyl radical of $C_1$–$C_6$ or a lower alkyl radical substituted with an isocyanate-reactive group; each R independently is hydrogen, a lower alkyl radical of $C_1$–$C_6$ or $(CH_2)_m$—X wherein X is an isocyanate-reactive group which is OH or $NH_2$ and m is 0, 1 or 2; and
n is 1 or 2;
with the proviso that at least one of $R^1$ or R is or comprises an isocyanate-reactive group.

A preferred compound of formula (I) wherein Y is O is an isocyanate-reactive cyclic carbonate which is glycerol carbonate.

Preferred compounds of formula (I) wherein Y is $NR^1$ are isocyanate-reactive cyclic ureas of formula:

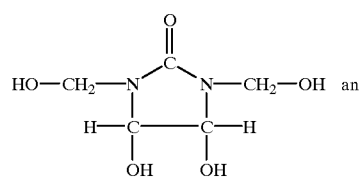

(II)

and

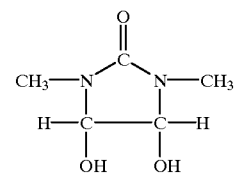

(III)

The isocyanate-reactive cyclic blowing promotor is used in amounts ranging from 1 to 99%, preferably from 1 to 60% by weight based on the total isocyanate-reactive material.

Further details of this process are described in EP 498628, EP 498629, EP 662494, WO 95/02620, WO 96/25455, WO 96/36655 (all incorporated herein by reference).

In operating the process for making open celled rigid polyurethane foams, the known one-shot, prepolymer or semi-prepolymer techniques may be used together with conventional mixing methods and the rigid foams may be produced in the form of slabstock, mouldings, cavity fillings, sprayed foam, frothed foam or laminates with other materials such as hardboard, plasterboard, paper, plastics or metal.

General descriptions of the construction of evacuated insulation panels and their use in thermal devices can be found in U.S. Pat. Nos. 5,066,437, 5,032,439 and 5,076,984 and European Patent Publications Nos 434266, 434225 and 181778, all incorporated herein by reference as well as the references mentioned therein.

Suitable enveloping vessels need to be highly impermeable for gases as the gas permeation rate of the vessel directly affects both the occurence of heat leakage and thus the thermal insulation efficiency of the resulting evacuated insulation panel as well as the operating lifetime of the panel. Also, they should prevent transmission of heat by conduction or radiation, be easily sealable by heat sealing and, preferably, flexible.

Materials suitable for the vessel include plastics such as polyester, polyvinylidene chloride, polypropylene and polyvinyl alcohol. Preferably the plastics film is vapor deposited with a metallic film or laminated with a metallic foil providing for higher protection against vacuum leak. The plastic bag may also include a thermoplastic heat sealing layer consisting of a thermoplastic resin having a relatively low melting point (lower than 200° C.). Examples of suitable thermoplastics include polyolefins, such as low density polyethylene, high density polyethylene and polypropylene, polyacrylonitrile, polyvinylidenechloride and copolymers thereof, and polyamine, such as nylon 11 and nylon 12, or a similar synthetic resin. For the film deposited on or foil laminated with the plastics film metals can be used such as aluminum, titanium, lead, iron and alloys thereof or tin and its alloys, such as tin alloys with antimony, bismuth and copper or mixtures thereof. Preference is given to a laminate of a thin Al foil.

It is preferred to precondition the insulating filler material prior to placement in the gastight envelope. This preconditioning involves heating and, optionally, agitating the filler material preferably under reduced pressure in order to remove contaminants from the surface of the filler. The removal of filler contaminants improves inter alia the expected panel life. Further the removal of contaminants reduces the time required to evacuate the vessel thereby reducing the time and cost associated with the manufacture of an evacuated insulation panel.

To improve the performance of the evacuated insulation panel, materials are provided within the sealed panels to absorb or otherwise interact with gases and vapors that remain due to imperfect evacuation, that permeate the enclosure from the outside atmosphere or evolve from the polyurethane foam filler itself. Such materials are known as getters and may include, for example, granulated calcium sulfate or microporous bariumoxide which is excellent in removing water vapor, activated carbon to remove organic gases, metals to absorb oxygen and nitrogen and zeolites to adsorb carbon dioxide and nitrogen. Other suitable getter materials are described in U.S. Pat. Nos. 4,000,246, 4,444, 821, 4,663,551, 4,702,986, 5,191,980, 5,312,606, 5,312,607 and 4,726,974, WO 93/25843 and in European Patent Publications Nos 434266 and 181778.

Refrigeration appliance is only a single example of a product that can utilise evacuated insulation panels. They can also form part of an insulated building panel. Other environments having a hot side and a cold side could also benefit from the use of the present invention, for example water heaters.

The evacuated insulation panels can be easily arranged in the door and walls of a refrigerator. They are generally attached by adhesive to the walls of the thermal device to be insulated and then foamed-in-place with a liquid organic material such as polyurethane. The polyurethane foam then assists in holding the panels between the walls and also provides additional insulation.

The invention is illustrated but not limited by the following examples.

EXAMPLE 1

An evacuated insulation panel was made by enveloping an open celled rigid polyurethane foam and a getter in a plastic film laminated with a thin Al foil, evacuating the whole to an internal pressure of 0.05 mbar and sealing the whole. The size of the panel was 274 mm×247 mm with an initial thickness of 30.4 mm. The initial density of the panel was 45.3 kg/m$^3$. The initial thermal conductivity of the panel was 5.6 mW/mK. The panel was compressed in a press at 20° C. to a thickness of 20.6 mm corresponding to a density of 66.8 kg/M$^3$. Thermal conductivity of this compressed panel was 4.4 mW/mK. The panel was further compressed to a thickness of 15.2 mm corresponding to a density of 90.5 kg/M$^3$. Thermal conductivity of this compressed panel was 4.1 mW/mK. The compressed panels were flat and showed almost no wrinkles (see photograph 1).

COMPARATIVE EXAMPLE 2

The open celled rigid polyurethane foam of example 1 was compressed to a thickness of 15.6 mm corresponding to a density of 88.2 kg/M$^3$ and subsequently enveloped in the same type of film as in example 1 above together with the same getter as in example 1 above, evacuated and sealed. The thermal conductivity of this compressed panel was 4.3 mW/mK. However the surface of this compressed panel was not flat and showed a lot of wrinkles (see photograph 2).

EXAMPLE 3

An evacuated insulation panel was made by enveloping an open celled rigid polyurethane foam and a getter in a plastic film laminated with a thin Al foil, evacuating the whole to an internal pressure of 0.05 mbar and sealing the whole. The initial thickness of the panel was 40 mm with an initial density of 30 kg/m$^3$. The initial thermal conductivity of the panel was 8 mW/mK. The appearance of the panel surface was poor to medium.

The panel was compressed in a flat bed type press at 20° C. to a thickness of 15 mm. Thermal conductivity of this compressed panel was 5.8 mW/mK. The surface of the panel was flat and good. A similar panel was compressed in the same way except for the fact that the compression took place at a temperature of 80° C. Thermal conductivity of this compressed panel was 5.1 mW/mK; the surface was flat and very good, mirror-like. Another similar panel was also compressed in the same way but this time at a temperature of 120° C. Thermal conductivity of this compressed panel was 4.8 mW/mK; the surface was flat and very good, mirror-like.

These results show that compressing the evacuated insulation panels at elevated temperatures further improves the surface appearance of the panels.

What is claimed is:

1. A method for producing an evacuated insulation panel comprising the steps of:
    enveloping an open celled (semi-)rigid insulating foam in a substantially gas impermeable flexible vessel to form an insulation panel,
    evacuating and sealing said insulation panel,
    wherein said insulation panel is compressed during or after said evacuating and sealing to a thickness of 10 to 90% of its initial thickness prior to compression, and
    wherein the compression step takes place at a temperature of between 70 to 150° C.

2. Method according to claim 1 wherein said insulation panel is compressed to a thickness of 20 to 80% of its initial thickness.

3. Method according to claim 2 wherein said insulation panel is compressed to a thickness of 40 to 60% of its initial thickness.

4. Method according to claim 3 wherein said insulation panel is compressed to a thickness of about 50% of its initial thickness.

5. Method according to claim 1 wherein the insulating foam comprises an open celled (semi-)rigid polyurethane or urethane-modified polyisocyanurate foam.

6. Method according to claim 1 wherein the compression step takes place at a temperature of between 70 and 120° C.

7. Method according to claim 5 wherein said polyurethane foam is prepared by reacting an organic polyisocyanate with an isocyanate-reactive material in the presence of a blowing promotor being an isocyanate-reactive cyclic compound of formula:

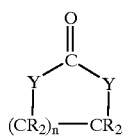

(I)

wherein
Y is O or $NR^1$ wherein each $R^1$ independently is a lower alkyl radical of $C_1$–$C_6$ or a lower alkyl radical substituted with an isocyanate-reactive group;
each $R_2$ independently is hydrogen, a lower alkyl radical of $C_1$–$C_6$ or $(CH_2)_m$—X wherein X is an isocyanate-reactive group which is OH or $NH_2$ and m is 0, 1 or 2; and
n is 1 or 2;
with the proviso that at least one of $R^1$ or $R_2$ is or comprises an isocyanate-reactive group.

8. Process according to claim 7 wherein the isocyanate-reactive cyclic blowing promotor is a cyclic urea of formula

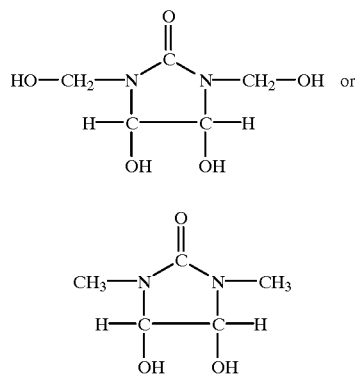

9. The method of claim 1, wherein said vessel comprises aluminum foil.
10. The method of claim 1, further comprising placing a filler material in said vessel.
11. The method of claim 10, further comprising preconditioning said filler material.
12. The method of claim 1, wherein said insulation panel is compressed after said evacuating and sealing.
13. The method of claim 1, wherein the compressing of said insulation panel is effected with the use of opposing parallel plates.
14. The method of claim 1, wherein the compressing of said insulation panel is effected with the use of opposing rolls.
15. The method of claim 1, wherein the compressing of said insulation panel is effected on-line.
16. The method of claim 1, wherein the compressing of said insulation panel is effected off-line.
17. A method for producing an evacuated insulation panel comprising:
enveloping an open celled (semi-)rigid insulating foam in a substantially gas impermeable flexible vessel;
thereafter evacuating and sealing said vessel comprising said foam; and
compressing the sealed vessel to 20 to 80% of its thickness,
wherein the sealed vessel is compressed at a temperature between 70 and 150° C.
18. The method of claim 17, wherein the sealed vessel is compressed to 40 to 60% of its thickness.
19. The method of claim 17, wherein the sealed vessel is compressed to about 50% of its thickness.
20. The method of claim 17, wherein the sealed vessel is compressed at a temperature between 70 and 120° C.
21. The method of claim 17, wherein the insulating foam comprises an open celled (semi-)rigid polyurethane or urethane-modified polyisocyanurate foam.
22. The method of claim 21, wherein said polyurethane or urethane-modified foam is prepared by reacting an organic polyisocyanate with an isocyanate-reactive material in the presence of a blowing promoter, said promoter being an isocyanate-reactive cyclic compound represented by the following formula (I):

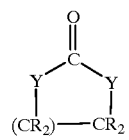

(I)

wherein
Y represents O or $NR^1$, with each $R^1$ independently representing a lower alkyl radical of $C_1$–$C_6$ or a lower alkyl radical substituted with an isocyanate-reactive group;
each $R_2$ independently represents hydrogen, a lower alkyl radical of $C_1$–$C_6$ or $(CH_2)_m$—X, with X representing OH or $NH_2$ and m representing 0, 1, or 2;
n represents 1 or 2; and
wherein at least one of $R^1$ or $R_2$ is or comprises an isocyanate-reactive group.
23. The method of claim 22, wherein said blowing promoter is represented by the following formula (2) or (3):

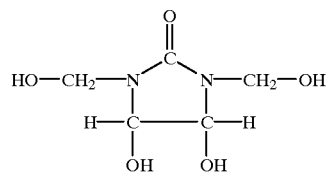

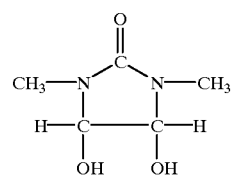

24. The method of claim 17, wherein said vessel comprises aluminum foil.
25. The method of claim 17, further comprising placing a filler material in said vessel.
26. The process of claim 25, further comprising preconditioning said filler material.

* * * * *